United States Patent [19]

Wagner

[11] Patent Number: 5,063,870
[45] Date of Patent: Nov. 12, 1991

[54] BOAT BOTTOM CONSTRUCTION

[76] Inventor: Warren Wagner, 48 Cypress Rd., Covington, La. 70433

[21] Appl. No.: 644,599

[22] Filed: Jan. 23, 1991

[51] Int. Cl.⁵ .............................................. B63B 5/24
[52] U.S. Cl. .................................................... 114/357
[58] Field of Search ................ 114/355, 356, 357, 358

[56] References Cited

U.S. PATENT DOCUMENTS

| | | | |
|---|---|---|---|
| 3,007,208 | 11/1961 | Urban | 114/355 |
| 3,064,238 | 11/1962 | Newberry et al. | |
| 3,315,284 | 4/1967 | Ludlow | 114/357 |
| 3,435,470 | 4/1969 | Krenzler | |
| 3,593,354 | 7/1971 | Carter | 114/357 |
| 3,611,461 | 10/1971 | Wurzberger | |
| 3,663,976 | 5/1972 | Momany | |
| 3,711,581 | 1/1973 | Fowler et al. | 114/355 |
| 4,032,689 | 6/1977 | Johnson et al. | |
| 4,131,962 | 1/1979 | Vernon | 114/357 |
| 4,495,884 | 1/1985 | Stark | 114/357 |
| 4,508,047 | 4/1985 | Bordat | |

Primary Examiner—Jesus D. Sotelo
Assistant Examiner—Stephen P. Avila

Attorney, Agent, or Firm—Fleit, Jacobson, Cohn, Price, Holman & Stern

[57] ABSTRACT

A boat hull bottom is provided including a contoured bottom panel having opposite longitudinal margins upwardly from which opposite hull sides project. A bottom panel is disposed between and secured to the hull sides at an elevation spaced above the bottom panel and a corrugated stiffener including longitudinal corrugations is disposed between the bottom panel and the underside of the flooring. The uppermost portions of the corrugated stiffener are bonded and mechanically secured to the flooring panel and the lowermost extremities of the corrugated panel are bonded to the bottom panel, the upwardly opening and downwardly opening channels defined by the corrugated stiffener each being substantially filled with expandable rigid foam floatation having adherent properties by injection the floatation material into the channels through openings provided thereof formed in the bottom panel opening into the upwardly opening channels and formed in the bottom panel and the upper web portions opening into the downwardly opening channels, the rigid foam floatation forming reinforcement between not only the flooring panel and the bottom panel but also between adjacent upstanding portions of the corrugated panel.

20 Claims, 3 Drawing Sheets

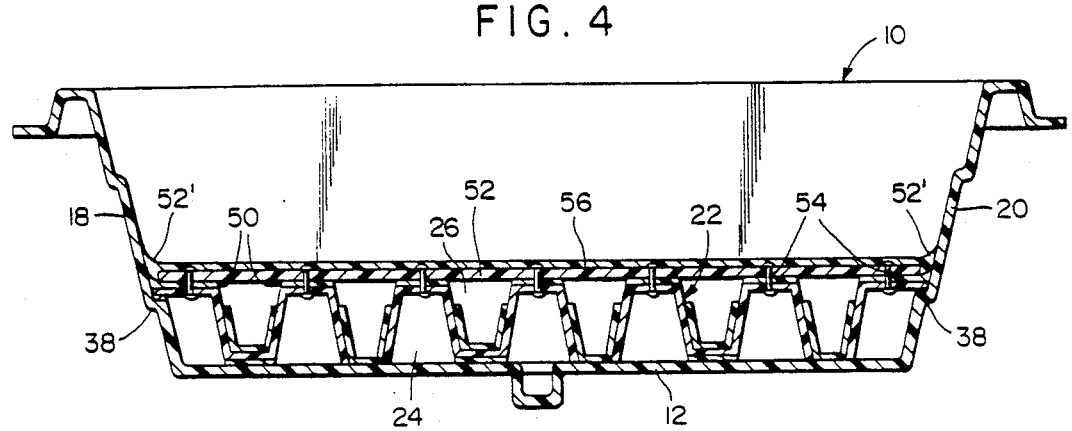
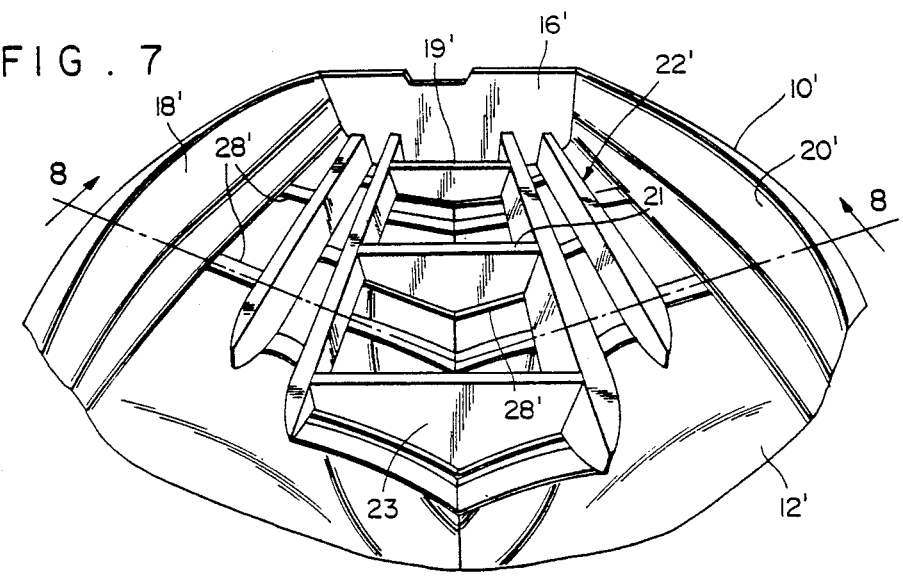
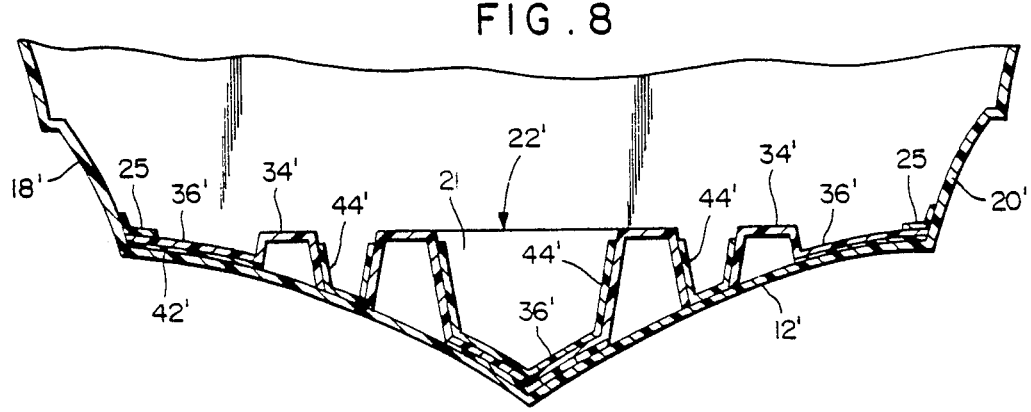

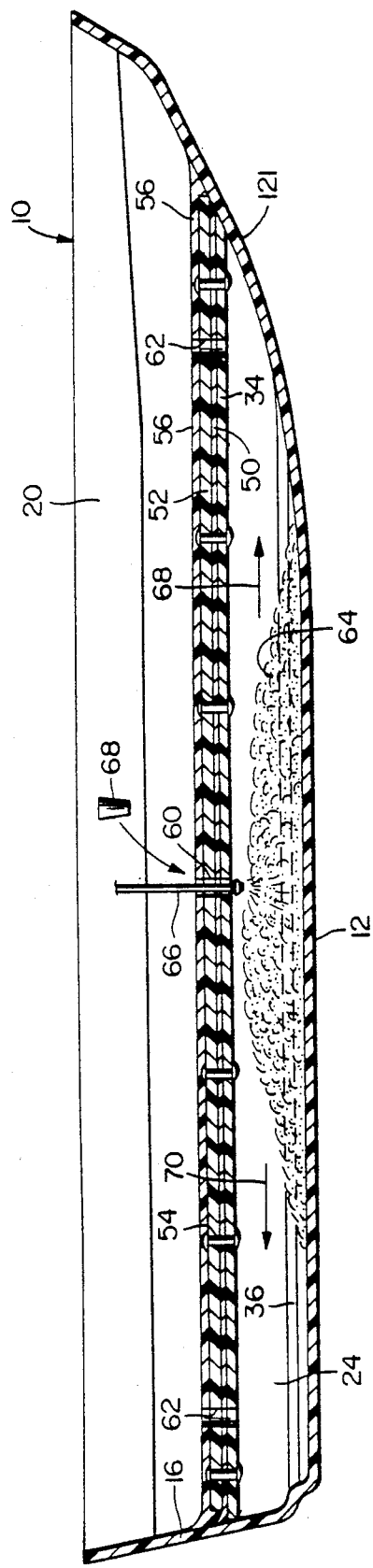
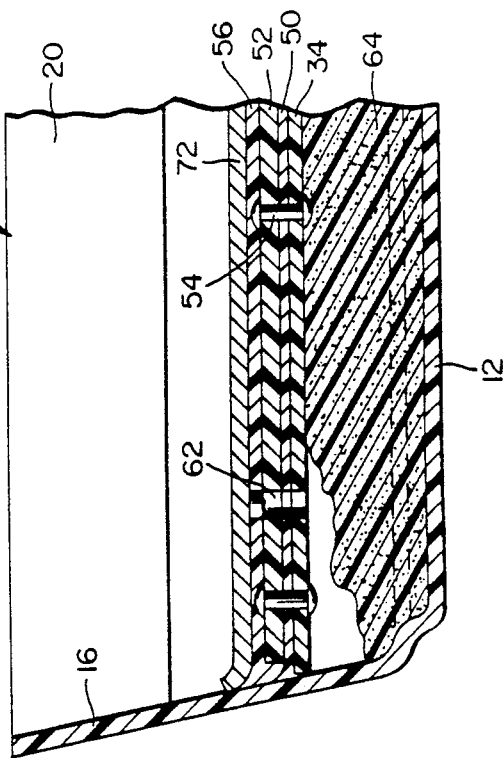

BOAT BOTTOM CONSTRUCTION

BACKGROUND OF THE INVENTION

1. Field of the Invention

This invention relates to a boat bottom construction which enable a boat bottom to be provided which is extremely rigid and yet light weight in construction. The boat bottom also provides extremely rigid support for flooring thereabove and floatation of the associated boat in excess of present day floatation requirements.

2. Description of Related Art

Various different forms of boat bottom constructions including some of the general structural features of the instant invention heretofore have been provided. Examples of such previously known boat bottom constructions are disclosed in U.S. Pat. Nos. 3,064,238, 3,435,470, 3,611,461, 3,663,976, 4,032,689 and 4,508,047.

However, these previously known forms of boat bottoms do not include the overall combination of structural and operational features of the instant invention which coact to provide a boat bottom having considerably more than required floatation, an extremely rigid boat bottom of light weight construction and a boat bottom which provides extremely boat flooring support.

SUMMARY OF THE INVENTION

The boat bottom of the instant invention incorporates structural features and a method of assembling the structural features which provides a boat bottom that is of light weight construction, extremely rigid and provides rigid support for cockpit flooring and also floatation in excess of presently required floatation.

The boat bottom incorporates, merely, a single layer boat bottom structure of conventional design, a corrugated stiffener disposed immediately above and rigidly bonded to the boat bottom, a cockpit flooring disposed over and rigidly bonded to the corrugated stiffener and foam floatation disposed within the downwardly opening troughs of the stiffener opposing the bottom as well as within the upwardly opening troughs of the stiffener and with the foam floatation comprising a rigid foam floatation having adherent properties, whereby all components of the boat bottom are bonded together to form an extremely rigid, buoyant, reinforced and light weight structure.

The main object of this invention is to provide a boat bottom (for either a flat skiff-type bottom, a modified V-bottom or a deep V-bottom).

The main object of this invention is to provide a boat bottom which is amply stiffened and yet of light weight construction.

Another object of this invention is to provide a boat bottom which includes floatation properties exceeding all present governmental floatation requirements.

Still another important object of this invention is to provide a boat bottom which affords rigid support for cockpit flooring and with the cockpit flooring ultimately bonded into position offering further stiffness to the boat bottom.

Yet another object of this invention is to provide a boat bottom construction which may be used in the manufacture of various different types of boat bottoms.

Another object of this invention is to provide a boat bottom construction which is relatively easy to fabricate and assemble.

A further very important object of this is to provide a boat bottom construction which may be readily varied as to its stiffness merely by increasing the stiffness of the corrugated stiffener thereof and/or the stiffness of the cockpit flooring to be utilized in conjunction therewith, independent of increasing the thickness of the boat bottom itself.

A final object of this invention to be specifically enumerated herein is to provide a boat bottom construction in accordance with the preceding objects and which will conform to conventional forms of manufacture, be of simple construction and easy to fabricate so as to provide a device that will be economically feasible, long-lasting and relatively trouble free in fabrication.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 4 is a transverse vertical sectional view similar to FIG. 3 illustrating the manner in which the cockpit flooring is bonded and mechanically secured to the corrugated stiffener of the hull and thereafter covered with a fiberglass layer also bonding the flooring to the sides of the hull;

FIG. 5 is a longitudinal vertical sectional view illustrating the manner in which foam floatation is injected into both the downwardly and upwardly opening channels of the corrugated stiffener;

FIG. 6 is a fragmentary enlarged longitudinal vertical sectional view illustrating in which a final fiberglass layer is applied over the flooring as a finish layer therefore and to close the openings through which the foam insulation was introduced and also the associated vent openings;

FIG. 7 is a fragmentary perspective view similar to FIG. 2 but illustrating the manner in which a corrugated stiffener is placed within a modified V-bottom hull; and FIG. 8 is an enlarged transverse vertical sectional view similar to FIG. 3 illustrating the manner in which the stiffener is bonded in place within the modified V-bottom hull.

DESCRIPTION OF THE PREFERRED EMBODIMENT

Figure 1:
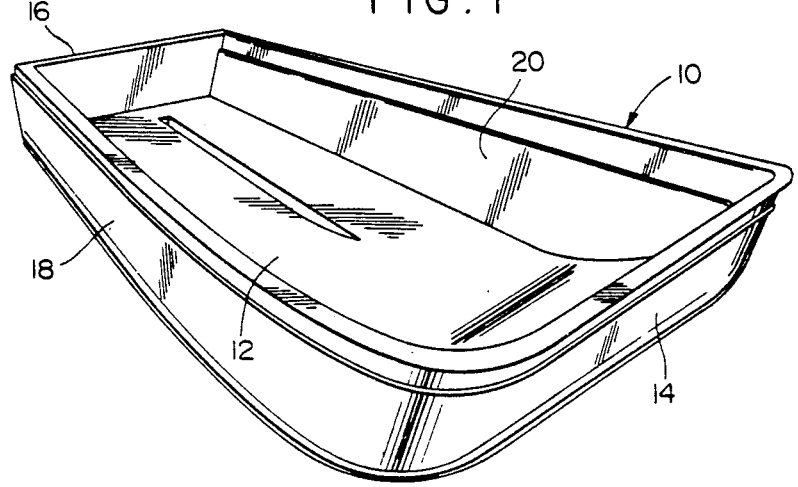
FIG. 1 is a perspective view of a bare, flat bottom hull to be used in constructing a flat bottom boat in accordance with the present invention.
Figure 2:
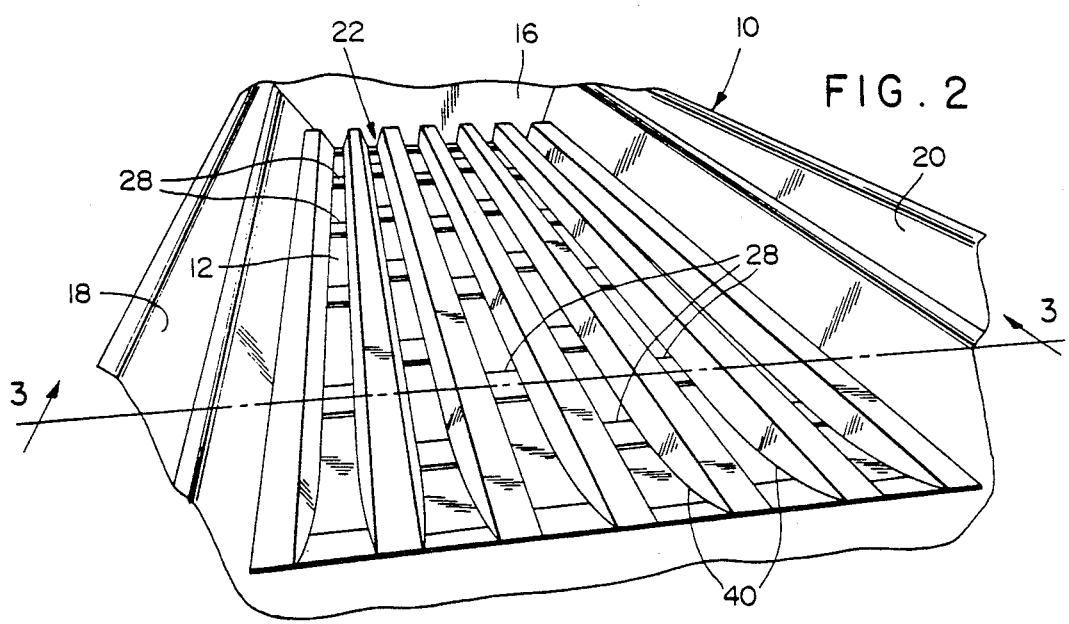
FIG. 2 is a fragmentary perspective view of the hull of FIG. 1 having the corrugated stiffener of the instant invention positioned therein.

Referring now more specifically to the drawings the numeral 10 generally designates a conventional form of hull including a substantially flat bottom 12 extending longitudinally of the hull 12 between the bow 14 and stern or transom 16 thereof. In addition, the hull includes opposite longitudinal sides 18 and 20, the bottom 12 interconnecting the lower margins of the bow 14, transom 16 and opposite sides 18 and 20.

This type of hull is conventionally provided with longitudinal stiffeners (not shown and comprising wooden beams) over the bottom 12 and which may be glassed into position. Thereafter a flooring is secured over and to such stiffeners. In addition, the spacing between the bottom 12 and the flooring secured over such stiffeners may be filled with foam floatation either in the form of floatation logs or sprayed-in foam floatation.

In the instant invention, the hull 10 is provided with a corrugated stiffener 22 which may be constructed of fiberglass. The corrugated stiffener 22 defines downwardly opening longitudinal channels 24 alternating transversely of the stiffener 24 with upwardly opening longitudinal channels 26. However, the bottom wall portions of the stiffener 22 defining the lower limits of the upwardly opening channels 26 are provided with elongated, longitudinally extending and longitudinally spaced windows or openings 28 to expose the bottom 12 through the openings 28.

Figure 3:
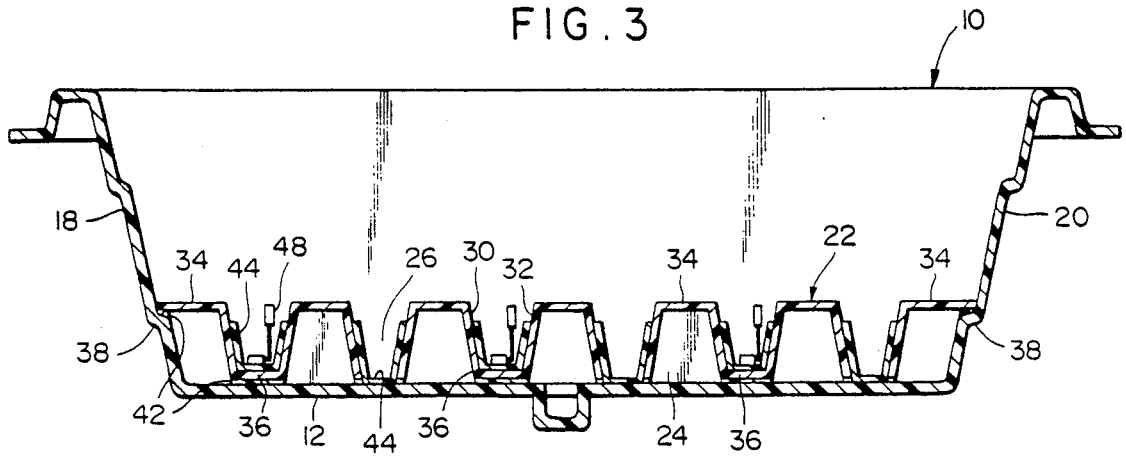
FIG. 3 is an enlarged fragmentary transverse vertical sectional view taken substantially upon the plane indicated by the section line 3—3 of FIG. 2 and illustrating the manner in which the corrugated stiffener is bonded to the interior of the hull bottom.

The stiffener 22 includes oppositely inclined upstanding walls 30 and 32, see FIG. 3, with the upper margins of the walls 30 and 32 interconnected by horizontal webs 34 and the lower marginal edges of the inclined walls 30 and 32 interconnected by horizontal webs 36.

The hull 10 is constructed of fiberglass or any other similar suitable material and includes side wall reinforcing steps 38 spaced above the bottom 12. Further, the stiffener 22 is designed such that the opposite longitudinal side marginal webs 34 overlap the inner surfaces of the steps 38 when the stiffener 22 is disposed within the hull 10 with the webs 36 resting upon the inner surface of the bottom 12. Further, the forward undersurfaces of the stiffener 22 are contoured as at 40 to conform to the upward curvature of the forward end of the bottom 12. Also, the rear end of the stiffener 22 terminates a spaced distance forward of the transom 16 if a self bailing well is to be provided, but the stiffener 22 may extend further rearwardly toward and abut the transom 16, if desired.

In order to bond the stiffener 22 to the bottom 12, chopped fiberglass and resin layers 42 are applied to the interior of the hull on the steps 38 and on the areas of bottom 12 to be opposed by the webs 36 and the stiffener 22 is thereafter placed within the hull 10 on the bottom 12 thereof to thus be bonded into position thereon. Further, chopped fiberglass and resin or fiberglass roving layers 44 and resin are applied in the channels 26 over the uncut away portions of the webs 36 and rolled out by rollers 48 or other means. The layers 44 extend upwardly appreciable distances along the inclined walls 30 and 32, bond the lower marginal edges of the inclined walls 30 and 32 to the bottom 12 in the areas of the openings 28 and bond the non-cut away portions of the webs 36 to the bottom 12.

Thereafter, the upper surfaces of the webs 34 are provided with a coating 50 of chopped fiberglass and resin or fiberglass roving and resin a flooring panel 52 is secured thereover through the utilization of suitable fasteners such as rivets 54. Accordingly, the layers 44 bond the stiffener 22 to the bottom 12 and sides 18 and 20 and the coatings 50 bond the flooring panel 52 to the stiffener 22 and the sides 18 and 20. Thereafter, a layer 56 of chopped fiberglass and resin or roving and resin is applied over the flooring panel 52 and up onto the interior of the sides 18 and 20 as at 52'. At this point, the bottom 12, the stiffener 22 and the flooring panel 52 are all bonded together as an integral unit and to the sides 16 and 18, see FIG. 4. Then, suitable openings or bores 60 are formed down through the layer 56, the flooring panel 52 and into the upwardly opening channels 26 and also downwardly through the layer 56, the flooring panel 52 and the coatings 50 and webs 34 into the downwardly opening channels 24 at generally the longitudinal mid point of the hull 10 and additional openings or bores 62 are similarly formed adjacent the front and rear ends of the channels 24 and 26, see FIG. 5.

Thereafter, an expandable rigid foam floatation material 64 having high floatation properties is injected into each channel 24 and 26 through the appropriate opening 60 by means of power nozzle 66. The duration of injection of rigid foam floatation material 64 through each bore 60 is determined by the known rate of flow of the material 64 through the nozzle 66 and the volume of the chamber 24 or 26 being filled. The material 64 is injected into the chambers 24 and 26 through the corresponding bores 60 at approximately the mid length portions of the channels 24 and 26 and expands forwardly and rearwardly as indicated by arrows 68 and 70 and as soon as the predetermined amount of material 64 has been injected into each chamber 24 or 26 the power nozzle 66 is removed and the bore 60 is immediately plugged through the utilization of a plug 68 driven inwardly to a position substantially flush with the upper surface of the layer 56. The plugs 68 prevent expansion of the material 64 outwardly through the bores 60 and thus the material 64 expands in the directions of the arrows 68 and 70 with the opposite ends of the chambers 24 and 26 being vented via the bores 62. When the material 64 is substantially fully expanded, the material 64 occupies substantially the full volume of each of the channels 24 and 26.

After all of the channels 24 and 26 have been filled with the material 64, the bores 62 are also plugged and a final layer 72 of chopped fiberglass and resin or roving and resin is applied over the layer 56. Alternately, the final layer 72 may comprise a suitable grade of marine carpeting.

As may be seen from FIGS. 5 and 7, the layer 56 also bonds the front and rear ends of the stiffener 22 to the forwardly and upwardly curving forward portion 12' of the bottom 12 and also to the transom 16.

If the hull 10 is relatively long, the foam insulation material 64 may be introduced into the channels 24 and 26 through the bores 62 and the channels 24 and 26 may be allowed to vent through the bores 60. Of course, if the bores 62 are utilized to introduce the foam insulation material into the channels 24 and 26, the bores 62 will be plugged with plugs such as the plug 68.

The rigid foam insulation material 64 not only is relatively light and sufficiently rigid to provide additional reinforcing for the overall bottom structure, but also is adhesive in nature such that the foam within the downwardly opening channels serves to further adhere the stiffener 24 to the bottom 12 and the foam material 64 within the channels 26 further serves to bond the floor panel 12 to the stiffener 22 and bottom 12.

With reference now more specifically to FIGS. 7 and 8 there will be seen a modified V-hull referred to in general by the reference numeral 10'. The hull 10' includes a bottom 12', a bow (not shown), a stern or transom 16' and opposite sides 18' and 20'. The hull 10' has a corrugated stiffener referred to in general by the reference numeral 22' corresponding to the stiffener 22 disposed therein. The stiffener 22' differs from the stiffener 22 in that the lower portions thereof are contoured to conform to the upper surfaces of the bottom 12' and also in that the stiffener 22 includes longitudinally spaced corrugations 19, 21 and 23 spanning between the center to longitudinal corrugations of the stiffener 22'. The transverse corrugations are provided, primarily, to provide storage compartments between the transom 16' and the rearmost transverse corrugation 19 and between the corrugations 19 and 21 and between the corrugations 21 and 23, to which compartments access may be had to through suitable hatches (not shown) utilized to open and close openings provided in a flooring utilized in the hull 10' similar to the flooring panel 52.

In any event, the stiffener 22' conforms to the interior shape of the bottom 12' and includes openings 28' corresponding to the openings 28. In addition, the stiffener 22' is bonded to the bottom 12' through the utilization of a chopped fiberglass and resin layer 42' corresponding to the layer 42 and through the utilization of layers 44' corresponding to the layers 44.

The corrugated stiffener 22' includes webs 34' corresponding to the webs 34 and webs 36' corresponding to the webs 36. Of course, the stiffener 22 also is bonded to the sides 18 and 20' as at 25.

After the stiffener 22' has been bonded to the bottom 12' in the same manner and the stiffener 22 is bonded to the bottom 12 as illustrated in FIG. 3, those additional steps illustrated in FIGS. 4, 5 and 6 in conjunction with the hull 10 are also carried out in conjunction with the hull 10'. Thus, both the hull 10 and the hull 10' may be provided with a light weight bottom which is strongly reinforced, which incorporates ample foam floatation and which also provides a very rigid support for a cockpit flooring.

It is pointed out, however, that in lieu of rivets 54, when the cockpit flooring is secured over the stiffener 22', threaded fasteners may be used. Further, the rigid foam floatation material 64 comprises two pound density polyurethane foam, or an equivalent foam material (non-CFC).

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A boat hull including upstanding longitudinal opposite sides, a bottom extending between and interconnecting said opposite sides and including inner and outer surfaces, a combined floor and bottom reinforcing and floatation assembly, said assembly including a generally horizontal, elongated, stiff and corrugated panel disposed longitudinally in said hull between said sides and including a plurality of elongated, generally parallel, longitudinally extending and laterally spaced apart downwardly opening channel members each including upstanding opposite side flanges having upper and lower margins and an upper bight portion extending between and interconnecting said upper margins, said lower margins conforming to the contour of and abutting against the underlying inner surface portions of said bottom, said assembly also including web portions spaced longitudinally of said panel and extending between and interconnecting lower margins of adjacent channel members, side flanges and web portions defining downwardly opening channel members between adjacent upwardly opening channel members, said lower margins and web portions being bonded to said inner surface, a rigid floor disposed over and secured to said bight portions, and foam floatation disposed in and substantially filling the interiors of said channel members, said foam floatation comprising rigid foam floatation with adherent properties whereby said foam floatation defines reinforcement between said side flanges and between said floor and bottom and also serves to adhere said floor and side flanges to said bottom and said side flanges and rigid floor to said bottom.

2. The boat hull of claim 1 wherein said floor is chemically bonded to said bight portions.

3. The boat hull of claim 2 wherein said floor is also mechanically anchored relative to said bight portions.

4. The boat of claim 1 wherein said lower margins are chemically bonded to said inner surface.

5. The boat hull of claim 1 wherein said web portions are chemically bonded to said inner surface.

6. The boat hull of claim 1 wherein at least major portions of said bight portions are co-planar and disposed in a plane spaced above said bottom and intersecting said opposite sides, said floor including longitudinal marginal portions anchored relative to said opposite sides.

7. The boat hull of claim 6 wherein said panel includes opposite side portions anchored to said opposite sides.

8. The boat hull of claim 1 wherein said panel includes a lateral central zone extending longitudinally thereof and defined between two adjacent, centered channel members of said channel members, said panel also including a plurality of integral longitudinally spaced, downwardly opening transverse channel members extending and secured between said central channel members dividing said central zone into at least three compartments opening upwardly toward said floor, said foam floatation also substantially filling the interiors of said transverse channel members, at least two of said compartments being devoid of said foam floatation.

9. The boat hull of claim 1 wherein said corrugated panel includes oppositely laterally outwardly directed additional web portions extending outwardly from the lower margins of the outermost opposite side channel members of said panel also bonded to said inner surface, terminating outwardly in upwardly directed additional flanges which in turn terminate upwardly in outwardly directed horizontal flanges coextensive with said bight portions, said horizontal flanges being bonded to said opposite sides and having said floor secured thereto.

10. The boat hull of claim 9 wherein each additional flange and each corresponding horizontal flange, hull side and adjacent hull bottom portion enclose a void also substantially filled with said foam floatation.

11. A boat hull including upstanding longitudinal opposite sides, a bottom extending between and interconnecting said opposite sides and including inner and outer surfaces, a combined floor and bottom reinforcing and floatation assembly, said assembly including a generally horizontal, elongated, stiff and corrugated panel disposed longitudinally within said hull between said sides, said corrugated panel including elongated laterally spaced apart upstanding flanges extending longitudinally of said panel and having upper and lower margins, alternate pairs of upper margins being interconnected by integral bight portions extending therebetween and alternate pairs of lower margins being interconnected by integral web portions extending therebetween, longitudinally spaced portions of said web portions being cut away, said lower margins and the remaining web portions conforming to the contour of and abutting against the underlying inner surface portions of said bottom, said lower margins and web portions being bonded to said inner surface, a rigid floor disposed over and secured to said bight portions, and rigid foam floatation at least substantially filling substantially all of the voids defined between said upstanding flanges, bight portions and inner surface and between said upstanding flanges, inner surface and floor, said foam floatation having adherent properties and also serving to bond said floor, said upstanding flanges and remaining web portions and inner surface exposed therebetween together and to further bond said bight portions, upstanding flanges and inner surfaces together, the rigidity of said foam floatation also serving to reinforce said upstanding flanges relative to each other and to said bottom and also serving to reinforce said bottom relative to said floor.

12. The boat hull of claim 11 wherein said web portions comprise integral strip portions of said panel spaced apart longitudinally of said panel and extending between said alternate lower margins.

13. The boat hull of claim 12 wherein said alternate lower margins, between adjacent longitudinally spaced strip portions, are secured to said inner surface.

14. In combination with a boat hull including upstanding longitudinal opposite sides and a bottom extending between and interconnecting lower margins of said sides and including inner and outer surfaces, the method of providing a floor in said hull spaced above said bottom and with said floor and bottom reinforced relative to each other, said method comprising:

A. Providing a horizontal, elongated corrugated panel including elongated, laterally spaced upstanding flanges extending longitudinally of said panel and having upper and lower margins with alternate pairs of laterally adjacent upper margins interconnected by integral bight portions extending therebetween and alternate pairs of laterally spaced lower margins interconnected by integral web portions extending therebetween and at least major portions of said lower margins and web portions contoured to conform to and abut against underlying inner surface portions of said bottom when said panel is positioned lengthwise in said bottom, said corrugated panel defining alternating laterally adjacent upwardly and downwardly opening channels, B. Positioning said corrugated panel lengthwise in said hull with major portions of said lower margins and web portions abutted against underlying inner surface portions of said bottom.

C. Sealingly anchoring said major portions of said lower margins and web portions to said inner surface, D. Providing a rigid horizontal floor panel, E. Positioning said rigid floor panel in said hull in supported engagement from said bight portions, F. Sealingly anchoring said floor panel to said bight portions; and G. Injecting expandable foam floatation into said upwardly opening channels and said downwardly opening channels with the foam floatation being of a type to establish, when expanded structural reinforcing between said bottom and floor panel as well as structural reinforcing between adjacent upstanding flanges of said corrugated panel against deflection relative to each other.

15. The method of claim 14 wherein said floatation foam also serves to bond the surface portions of said corrugated panel defining said downwardly opening channels to said bottom and the surface portions of said corrugated panel defining said upwardly opening channels to said floor panel.

16. The method of claim 14 including the step of bonding opposite side longitudinal marginal portions of said floor panel to said opposite sides.

17. The method of claim 16 including the step of bonding opposite side longitudinal marginal portions of said corrugated panel to said opposite sides subsequent to step C and prior to step E.

18. The method of claim 14 wherein the step of filling said channels with foam floatation includes the step of forming bores downwardly through said floor panel and bight portions into said channels and with at least one pair of bores opening downwardly into each channel at points spaced longitudinally of said hull, injecting an expandable foam floatation into each channel through at least one of the corresponding bores opening thereinto and allowing the injected foam to expand longitudinally of the channel toward at least one other corresponding bore opening thereinto.

19. The method of claim 18 wherein the amount of foam mixture injected into each channel constitutes an amount sufficient only to substantially fill each channel with expanded foam.

20. A boat hull including upstanding longitudinal opposite sides, a bottom including inner and outer surfaces extending between and interconnecting said opposite sides, a corrugated panel including generally parallel, horizontal and laterally spaced apart upstanding flanges including upper and lower margins interconnected by upper and lower generally horizontal web and bight portions, respectively, extending between and formed integrally with said upper and lower margins, said panel being disposed within said hull with said corrugations extending longitudinally of said hull and said lower bight portions abutted against and bonded to said inner surface, a floor panel positioned within said hull and downwardly abutted against, supported from and bonded to said upper web portions, said floor panel including opposite side longitudinal margins bonded to said opposite sides, said corrugated panel defining, between pairs of adjacent upstanding flanges disposed between adjacent upper web portions, upwardly opening channels closed at their upper extremities by said floor panel and downwardly opening channels defined between pairs of adjacent upstanding flanges disposed between laterally adjacent lower bight portions with said downwardly opening channels closed by said bottom, and foamed-in foam floatation at least substantially filling said channels with said foam floatation comprising a rigid foam floatation and having adherent properties, whereby said foam floatation defines reinforcement between said upright flanges to resist deformation thereof, reinforcement between said floor panel and said bottom to resist deformation thereof and with said foam floatation also serving to bond the upper horizontal web portions of said corrugated panel to said bottom and the lower bight portions of said corrugated panel to said floor panel.

* * * * *